(12) United States Patent
Agam et al.

(10) Patent No.: US 8,353,321 B2
(45) Date of Patent: Jan. 15, 2013

(54) METHOD AND SYSTEM FOR SHORT-RANGE ULTRASONIC LOCATION SENSING

(75) Inventors: Uri Agam, Montréal (CA); Eli Gal, Montréal (CA); Pino Marcovecchio, Montreal (CA)

(73) Assignee: Sensotech Inc., Montreal (CA)

( * ) Notice: Subject to any disclaimer, the term of this patent is extended or adjusted under 35 U.S.C. 154(b) by 1358 days.

(21) Appl. No.: 11/697,546

(22) Filed: Apr. 6, 2007

(65) Prior Publication Data

US 2007/0272019 A1    Nov. 29, 2007

Related U.S. Application Data

(60) Provisional application No. 60/744,742, filed on Apr. 12, 2006, provisional application No. 60/805,519, filed on Jun. 22, 2006.

(51) Int. Cl.
*B65B 1/30* (2006.01)
(52) U.S. Cl. ............... 141/198; 141/83; 141/94; 141/95
(58) Field of Classification Search ............... 141/83, 141/94, 95, 198; 250/216, 221, 222.1; 367/104
See application file for complete search history.

(56) References Cited

U.S. PATENT DOCUMENTS

| | | | |
|---|---|---|---|
| 3,045,445 A | 7/1962 | MacLeod | |
| 3,367,127 A | 2/1968 | Walker | |
| 3,731,496 A | 5/1973 | Frazier | |
| 3,823,846 A | 7/1974 | Probst | |
| 3,863,196 A | 1/1975 | Hilles | |
| 4,040,457 A * | 8/1977 | Niese et al. | 141/361 |
| 4,202,049 A | 5/1980 | Wetzel | |
| 4,202,387 A | 5/1980 | Upton | |
| 4,437,497 A * | 3/1984 | Enander | 141/1 |
| 4,733,381 A | 3/1988 | Farmer et al. | |
| 4,780,861 A | 10/1988 | Stembridge et al. | |
| 4,807,086 A | 2/1989 | Chambliss | |
| 4,822,996 A | 4/1989 | Lind | |

(Continued)

FOREIGN PATENT DOCUMENTS

JP    61117478 A2    6/1986
(Continued)

OTHER PUBLICATIONS

International Search Report mailed Jul. 23, 2007 issued in Application No. PCT/CA2007/000583.

*Primary Examiner* — Timothy L Maust
(74) *Attorney, Agent, or Firm* — Agence de Brevets Fournier; Claude Fournier

(57) ABSTRACT

A system and method for short-range ultrasonic detecting of a target is proposed herein to be used for example in a liquid-dispensing system such as those provided in home refrigerators. The system comprises a sensor assembly including a transmitter and a receiver positioned side by side so as to yield respective transmitting and receiving beams which overlap to define an asymmetrical shaped detection area, a controller coupled to both the transmitter and receiver to activate the transmitter and for receiving echoes indicative of the target from the receiver and to the dispensing system for opening a valve of the dispensing system when a target is detected. Noises and false alarm rate minimization methods are implemented, including variable relevance zones and requiring a void of signal before excitation.

24 Claims, 11 Drawing Sheets

U.S. PATENT DOCUMENTS

| | | | |
|---|---|---|---|
| 4,869,287 A | 9/1989 | Pepper et al. | |
| 4,917,155 A * | 4/1990 | Koblasz et al. | 141/1 |
| 4,960,248 A | 10/1990 | Bauer et al. | |
| 4,961,456 A | 10/1990 | Stembridge et al. | |
| 5,002,102 A | 3/1991 | Hosel | |
| 5,036,892 A | 8/1991 | Stembridge et al. | |
| 5,059,812 A | 10/1991 | Huber | |
| 5,060,484 A | 10/1991 | Bush et al. | |
| 5,079,752 A * | 1/1992 | Bloomfield | 367/104 |
| 5,131,271 A | 7/1992 | Haynes et al. | |
| 5,515,340 A * | 5/1996 | Kim et al. | 367/104 |
| 5,551,598 A | 9/1996 | Cutsinger | |
| 5,573,041 A | 11/1996 | Skell et al. | |
| 5,868,311 A * | 2/1999 | Cretu-Petra | 236/12.12 |
| 5,907,521 A * | 5/1999 | Matsui et al. | 367/162 |
| 6,100,518 A * | 8/2000 | Miller | 250/222.1 |
| 6,227,053 B1 | 5/2001 | Purpura et al. | |
| 6,250,601 B1 * | 6/2001 | Kolar et al. | 251/129.04 |
| 6,265,709 B1 * | 7/2001 | Olson et al. | 250/221 |
| 6,347,552 B1 | 2/2002 | Purpura et al. | |
| 6,394,153 B2 * | 5/2002 | Skell et al. | 141/351 |
| 6,425,425 B2 | 7/2002 | Bianchi et al. | |
| 6,554,771 B1 | 4/2003 | Buil et al. | |
| 6,705,356 B2 * | 3/2004 | Barton et al. | 141/2 |
| 6,789,585 B1 * | 9/2004 | Janke | 141/198 |
| 7,546,854 B2 * | 6/2009 | Ozanne et al. | 141/198 |
| 7,673,661 B2 * | 3/2010 | Chase et al. | 141/360 |
| 7,690,403 B2 * | 4/2010 | You et al. | 141/83 |

FOREIGN PATENT DOCUMENTS

JP    2000019243 A2    1/2000

* cited by examiner

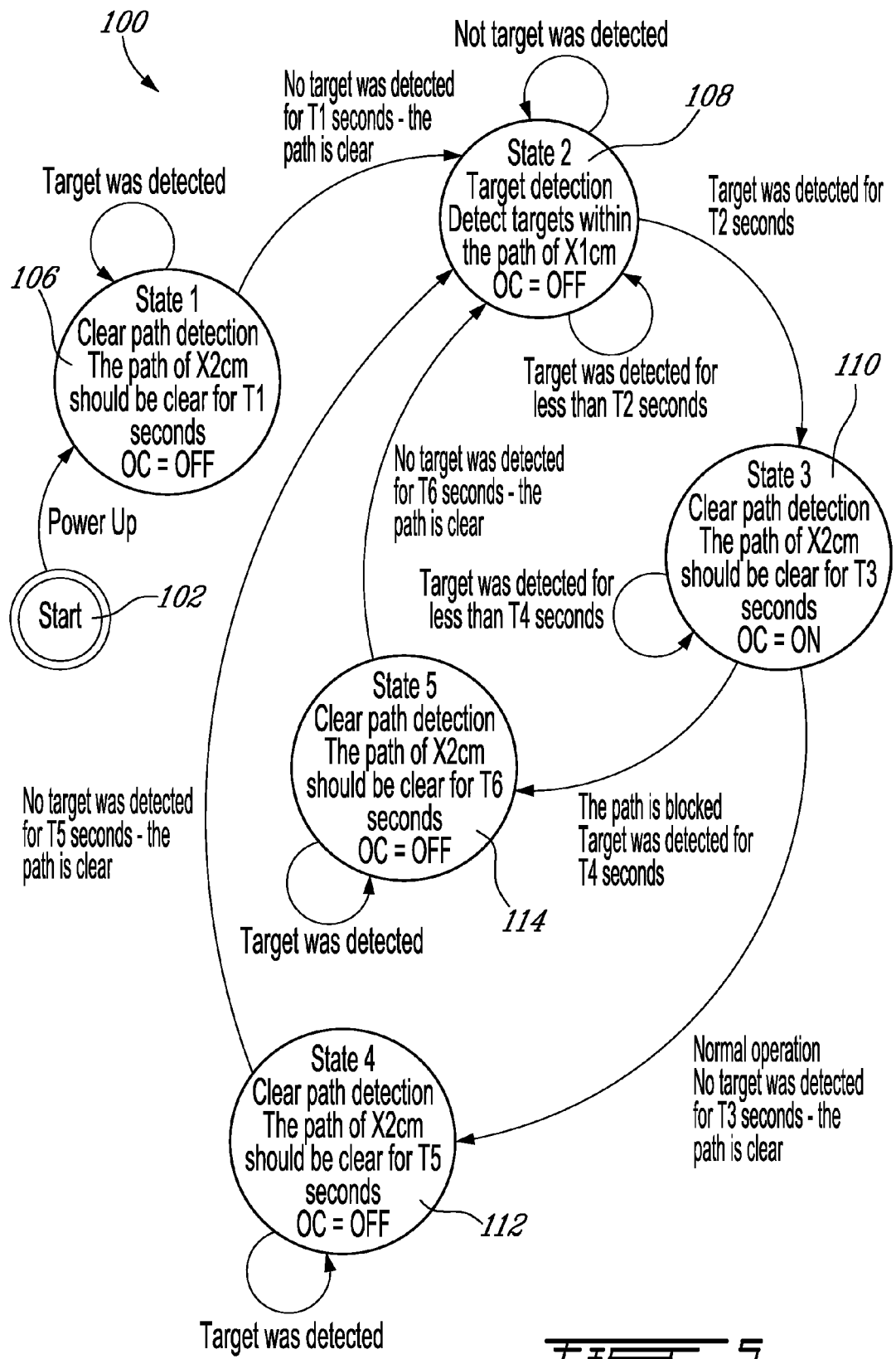

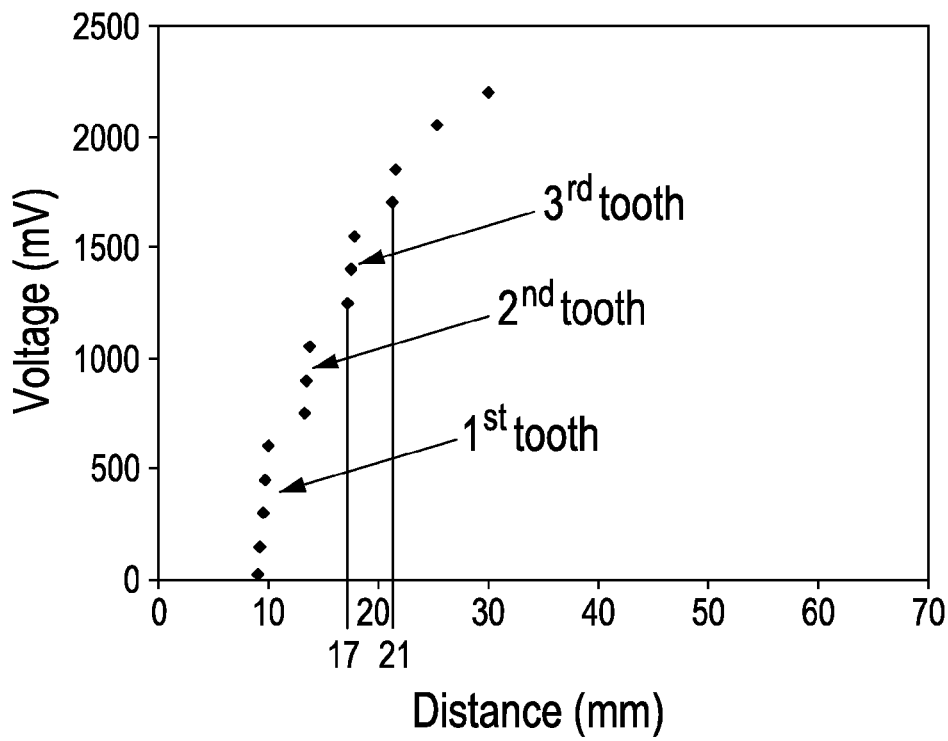
FIG. 6C
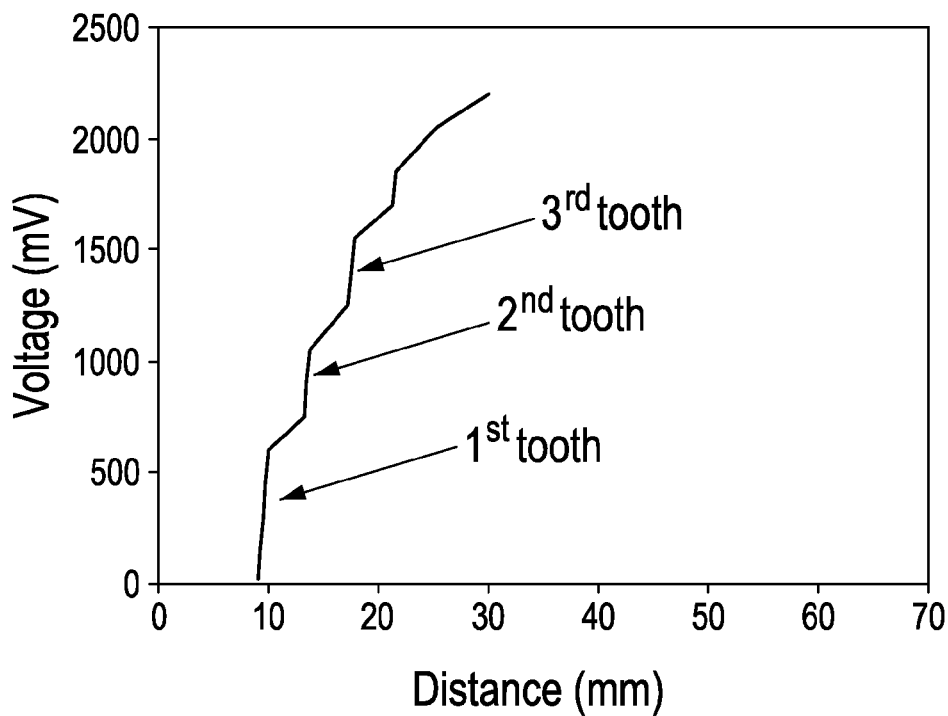
FIG. 6D

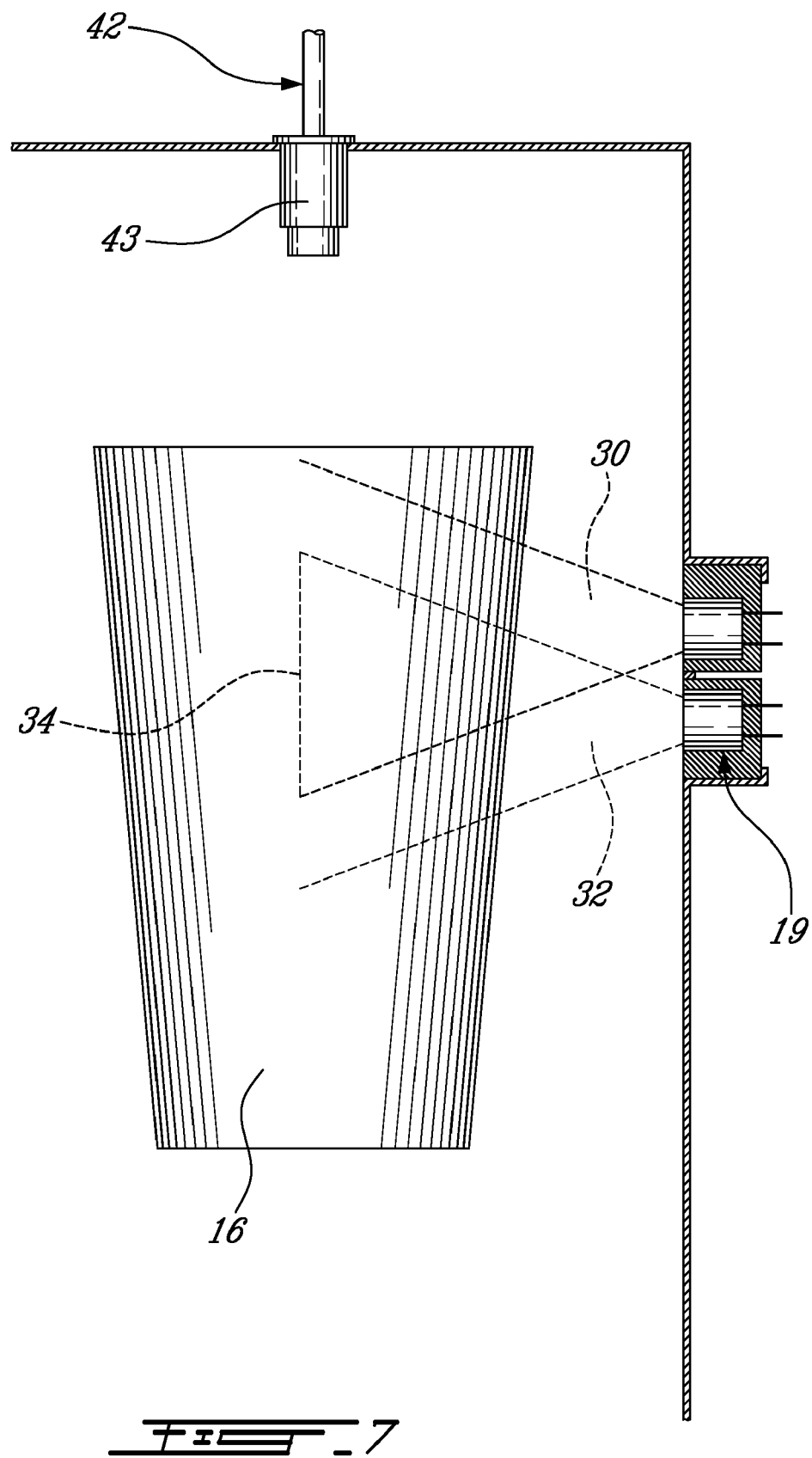

METHOD AND SYSTEM FOR SHORT-RANGE ULTRASONIC LOCATION SENSING

FIELD

The present invention concerns object detection and more specifically a method and system for short-range ultrasonic location sensing.

BRIEF DESCRIPTION OF THE DRAWINGS

In the appended drawings:

FIG. 5 is a second flowchart illustrating the method from FIGS. 4A-4C;

FIGS. 6A-6D are graphs illustrating a Multiple Threshold and Signal Reconstructing Method according to a first illustrative embodiment of the present invention;

FIG. 7 is a cross section of the automatic water dispensing system from FIG. 1;

DETAILED DESCRIPTION

Figure 1:
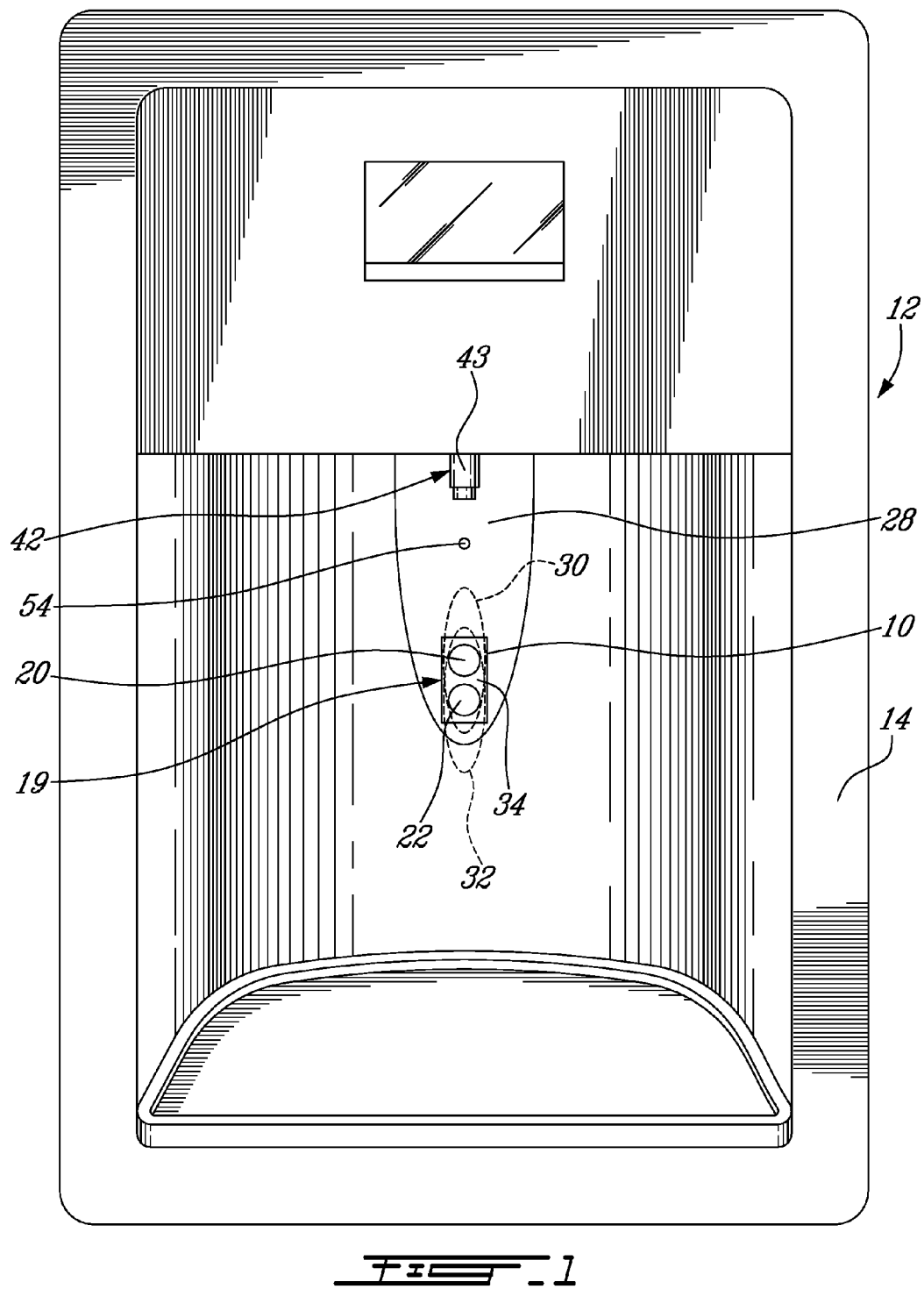
FIG. 1 is a front perspective view of an automatic water dispensing system including a system for short-range ultrasonic location sensing according to a first illustrative embodiment of the present invention.

In accordance with a first aspect of the present invention, there is provided a system for short-range ultrasonic detecting of a target comprising:

a sensor assembly including a transmitter and a receiver positioned side by side so as to yield respective transmitting and receiving beams which overlap to define an asymmetrical shaped detection area; and a controller coupled to both the transmitter and receiver to activate the transmitter and for receiving echoes indicative of the target from the receiver.

According to a second aspect of the present invention, there is provided a method for short-range ultrasonic detecting of a target comprising:

creating an ultrasound transmitting beam;

creating a receiving beam which overlaps the ultrasound transmitting beam so as to define an asymmetrical shaped detection area;

whereby, in operation, the target entering the detection area creating an echo which is indicative of the target.

The use of two transducers side-by-side on a same plan allows providing an ellipsoid shaped detection area which is different from the simple cone which results from traditional one-transducer based systems. This tallows overcoming the initial ringing parameter which causes a "dead zone" in one-transducer based systems.

A method and system for short-range ultrasonic detecting of a target according to the present invention therefore allows for a close proximity and more accurate detection area throughout the temperature range.

According to a third aspect of the present invention, there is provided a system for detecting a container under a dispenser, the system comprising:

a sensor assembly for generating an ultrasound beam under the dispenser; and a controller coupled to both the dispenser and the sensor assembly for triggering the generating of the ultrasound beam, for receiving signals indicative of the ultrasound beam from the sensor assembly, and for triggering the activation of the dispenser when one of the signals is indicative of the ultrasound beam being cut and deactivation otherwise.

According to a fourth aspect of the present invention, there is provided a method for detecting a container under a dispenser comprising:

generating an ultrasound beam under the dispenser; and triggering the opening of the dispenser when the ultrasound beam is cut.

Other objects, advantages and features of the present invention will become more apparent upon reading the following non restrictive description of illustrated embodiments thereof, given by way of example only with reference to the accompanying drawings.

A system 10 for short-range ultrasonic sensing according to first illustrative embodiment of the present invention will now be described with reference to FIGS. 1 to 3.

According to the first illustrative embodiment, the system 10 is part of an automatic water dispenser 12 such as those mounted in a refrigerator door 14. In such a system 12, the system 10 for short-range sensing allows detecting the presence of a container, such as a glass or cup 16 (see FIG. 7), so as to operate the refrigerator water valve (not shown).

The system 10 can be integrated to other type of liquid dispenser, such as a commercial soft drink dispenser.

Figure 2:
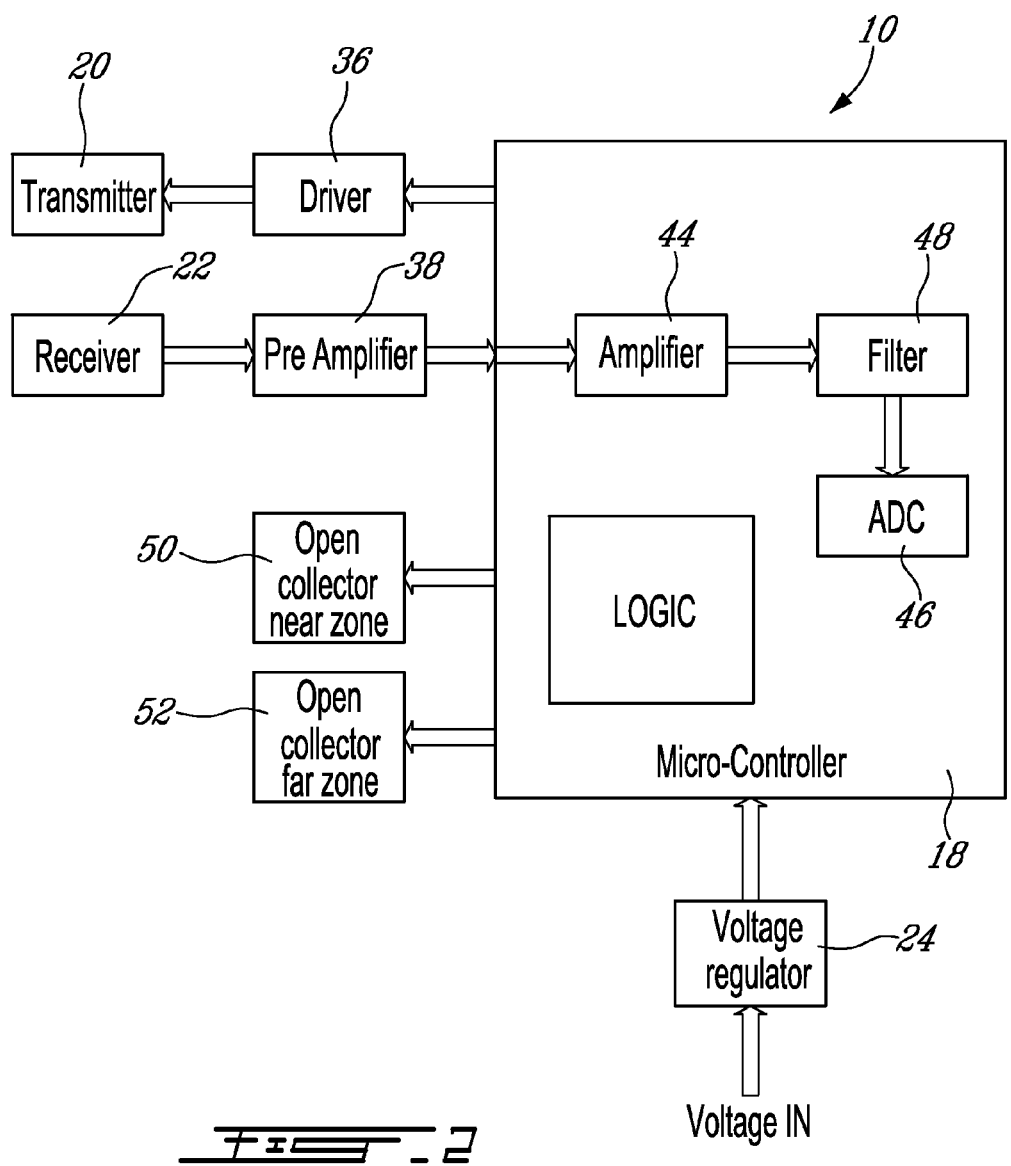
FIG. 2 is a block diagram of the system for short-range ultrasonic location sensing from FIG. 1.

As illustrated in FIG. 2, the system 10 generally comprises a micro-controller 18, a sensor assembly 19 including two ultrasonic transducers, a transmitter 20 and a receiver 22 which are both connected to the micro-controller 18, and a voltage regulator 24.

Figure 3:
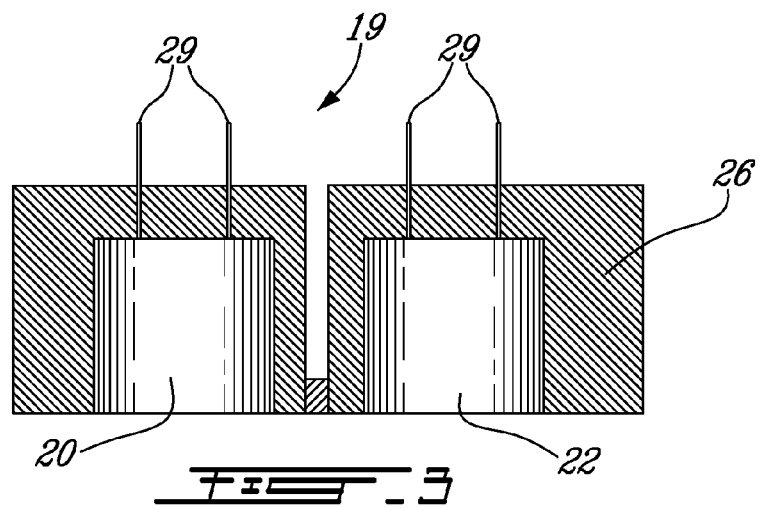
FIG. 3 is a cross section of the detector assembly of the system from FIG. 1.
Figure 4A:
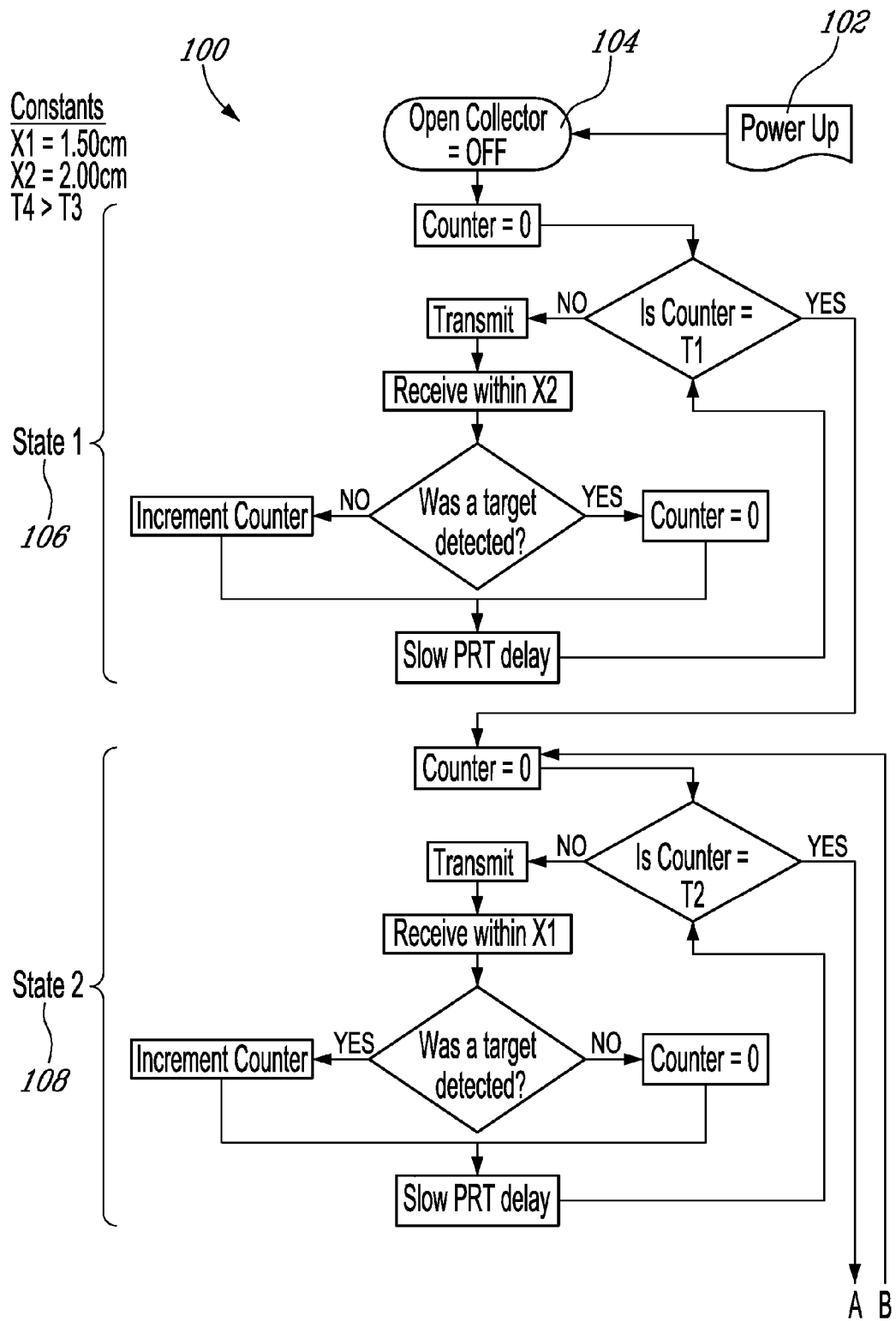
FIGS. 4A-4C illustrate a flowchart of a method for short-range ultrasonic detection of a target according to a first illustrative embodiment of the present invention.
Figure 4B:
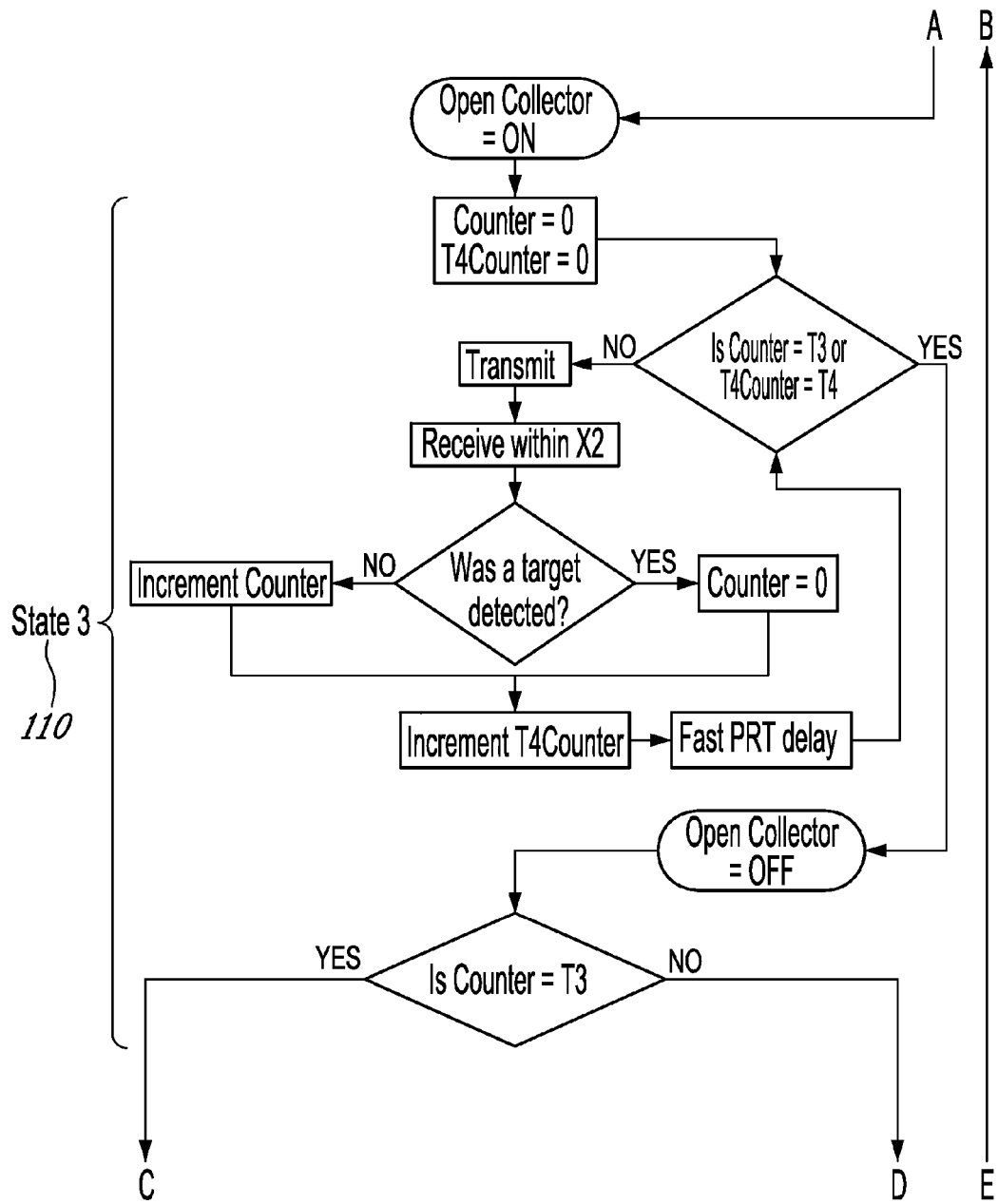
Figure 4C:
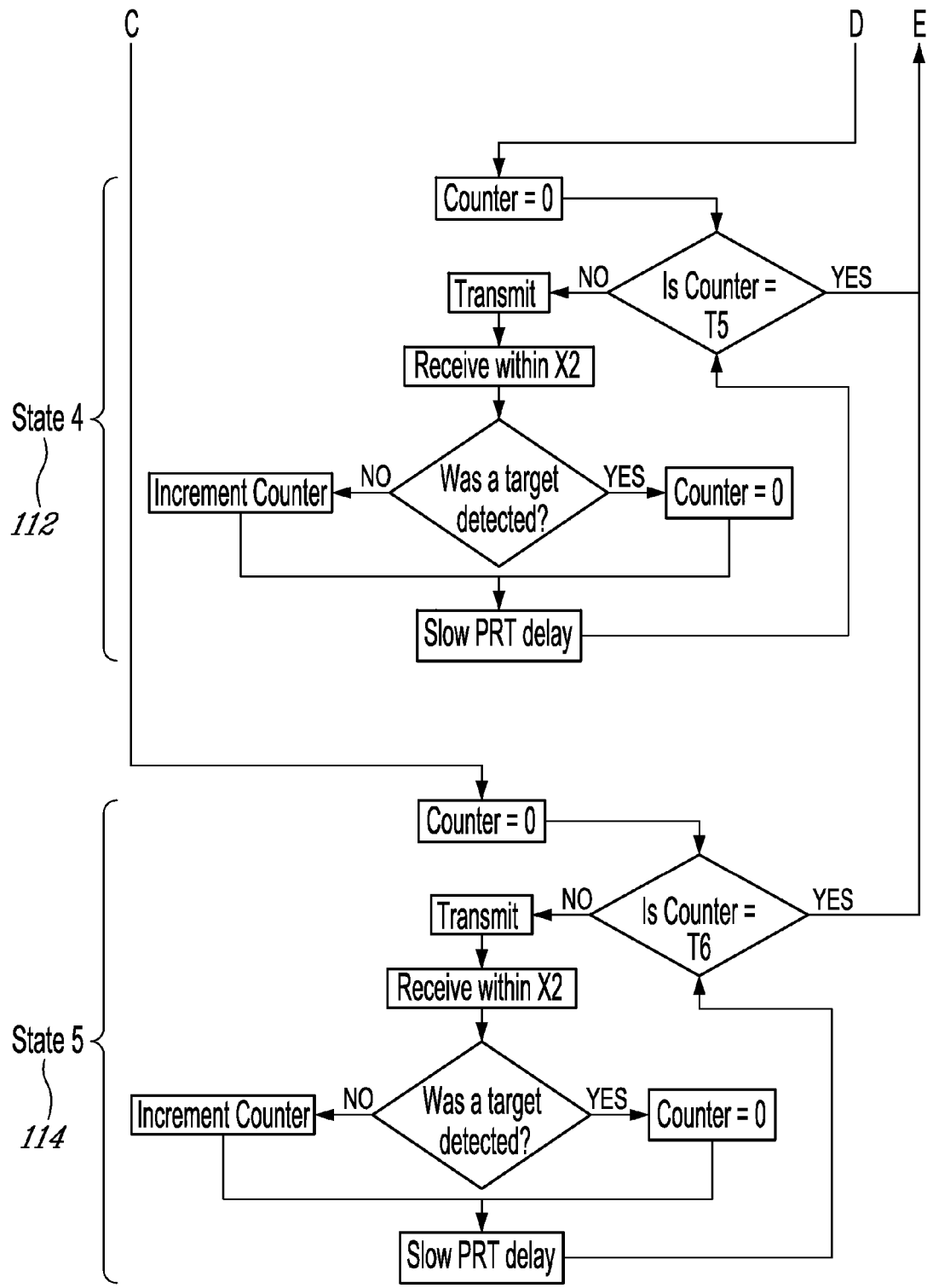

Turning now to FIG. 3, the sensor assembly 19 will now be described in more detail.

Each of the emitter 20 and receiver 22 are mounted in a rubber isolator 26 and mounted to a dispenser back panel 28 (see FIG. 1) side by side. The sensor assembly 19 allows the mounting of the transmitter 20 and transceiver 22 directly on the electronic board (not shown) which receives the micro-controller 18 using their pins connections 29.

The two transducers 20-22 are so relatively positioned as to yield overlapping asymmetrical shaped sonic beams 30-32 (see FIG. 1). More specifically, the sonic cones 30-32 are ellipsoidal. The overlap 34 between the emission and reception cones 30-32 defines the detection area of interest. The shape and dimension of the overlap 34 can be adjusted by the detection angles in the two directions perpendicular to the direction of the beams and relative distance of the two transducers 20-22.

The cross-section of the beam is used so that the detection area is optimized. However, the radial section can also be used for example.

The transmitter 20 is connected to the micro-controller 18 via a driver 36 which provides a differential voltage to the transmitter 20. The number of pulses applied varies with the detection zone as will be explained hereinbelow in more detail. As it is well-known in the art, the transmitter 20 converts the voltage into sound pressure.

Typically, the transmitter driver 36 is driven via a 40 kHz (λ=7.5 mm) pulses from the micro-controller 18 through a power transistor (not shown). Positive and negative currents are routed via two diodes (not shown). The driving voltage is 5Vp-p. Of course, other configurations can be used to drive the transmitter 20. The transmitter driver 36 can operate at other frequencies such as within the range between 40 kHz and 60 kHz having λ=7.5 mm to 5 mm.

A pre amplifier 38 is provided between the receiver 22 and the micro-controller 18 to pre amplify the signals produced from the receiver 22 from echoes reflected from the target 40 (see FIG. 7) before they are fed to the micro-controller 18. For example, two stages of linear amplification with a gain of 80 dB can be used.

The voltage regulator 24 provides a regulated voltage to the micro-controller 18 and to the transmitter driver 24.

According to the first illustrated embodiment, the voltage regulator 24 can accept 10 to 30 VDC (typically 12 VDC) as an input, and generates 9 VDC output to feed the pre amplifier 38 through noise isolation filter (not shown). 5 VDC to feed the micro-controller and other circuitries is generated through a Zener diode for example (not shown). Input power supply is protected against reverse polarity.

The Input/Output connection is provided through three wires; +VDC IN (+12 VDC), Ground, and Current sink source which also allow to activate the dispenser 42.

The micro-controller 18 emulates analog and digital circuitries in real time, including an amplifier 44 that amplifies the incoming signal from the receiver, and an analog-to-digital converter (ADC) connected to the amplifier 44 via a filter block 48. Simulating these circuitries in the micro-controller 18 allows reducing production cost and provides design flexibility. Circuitries can of course be provided to perform the same controller functions.

The micro-controller 18 further controls the open collectors, as will be described hereinbelow in more detail. It activates the transmitter 20 and then looks for received echoes, indicative of the detection of a target container 16.

The micro-controller 18 is further programmed to selectively activate and deactivate the dispenser 42 based on the measured distance, in the time domain, of a detected target.

More specifically, a buffer transistor and open collector transistor pair (both not shown) are provided to drive the dispenser 42 activation/deactivation. The open collector transistor keeps the dispenser 42 deactivated when there is a power shut down. The buffer transistor allows avoiding dispensing water during reset. Other logic can be provided to drive the activation/deactivation of the dispenser 42.

As illustrated in FIG. 2, and as will be described hereinbelow in more detail, the micro-controller 18 implements an algorithm allowing to determine if an object crosses a far limit or a close limit. Thereby, the system 10 implements a first open collector for a far zone 52 and a second open collector for a near zone 50 respectively.

According to the first illustrative embodiment, the far zone open collector 52 operates a LED 54 on the panel 28, or another means to inform the user that a container has entered the far detection zone, and the near zone open collector 50 operates the dispenser or water valve. Each of the two open collectors 50-52 can be used to operate other systems, apparatuses or devices (not shown). As will be described furtherin, the criteria to determine whether an object is crossing the far or close limit is determined by the micro-controller logic.

According to a further embodiment, the system 10 includes two open collectors in series (not shown) wherein the first one acts as a protection for short circuit in either one of the two open collector transistors. Each one of these two open collectors is controlled from a different micro-controller port to allow for protection of port failure.

According to still another embodiment, the system 10 further includes a relay which is triggered through the open-collector transistor.

Returning to the system 10 according to the first illustrated embodiment, algorithms are implemented in the micro-controller 18 to allow precise detection of a container 16 at a predetermined location, for example relatively to the dispenser spigot 43 thereunder, and which will activate the dispenser 42 and then deactivate it when the container 16 is withdrawn.

First, a wake up zone is implemented which allows to switch the system 10 from a low energy consumption mode or sleep mode to a full working mode. This is achieved by dynamically modifying the position of the field of interest 34 so as to detect objects for example at a position about 25 cm away in front of the sensor assembly 19. When an object crosses the wake up zone, the system 10 switches from the low energy consumption mode to a regular mode. One of the differences between the two modes is that most of the components of the micro-controller 18 are shut down to save on power consumption when in the low energy consumption mode compare to in the full working mode wherein lower current is also used. In the full working mode, the micro-controller 18 causes the driver 36 to apply less pulses to the transmitter 20, but the repetition rate is increased so as to improve sensitivity, reduce False Alarm Rate (FAR) and contribute to the long system mean time between failures (MTBF).

The micro-controller 18 is further programmed so as to implement variable relevance zones, which yields a different detecting zone for an incoming container 16 than for the outgoing container 16. Furthermore, a hysteresis is created wherein the limit from which an appearing target is declared is different than the limit from which a target seizes to be one. For example, a first detecting zone begins within 20 mm from the sensor assembly 19. After having been declared a "target", the container 16 or another object will seize to be a target when it will be 25 mm or more from the sensor assembly 19.

In another application, it is to be noted that the system 10 could be modified so as to implement a different number of such relevance zones.

More generally, the micro-controller 18 can be programmed with software tracking algorithm allowing to make decisions based on the direction and speed of the container 16. This is allowed by the position of the sensor assembly 19 relatively to the spigot 43 and the relative position of the transmitter 20 and receiver 22 which yields overlapping transmitting and receiving beams whose position can be dynamically modified, for example relatively to the spigot 43.

Turning now to FIGS. 4A-4C and 5, a method 100 for short-range ultrasonic detection of a target will now be described. The method 100 is implemented in the micro-controller 18 to minimize erroneous activation/deactivation of the dispenser 42. The method 100 includes five (5) detecting states.

When the system 10 is powered up 102, the open collector near zone 50 and open collector far zone 52 are both off (step 104). In state 1 (step 106), the system 10 verifies whether there is a target within an x2 cm distance in front of the sensor assembly 19, and remains in state 1 for T1 s after the path defined by x2 is free. The method 100 then proceeds to state 2 (step 108).

While in state 1, the period of time (PRT) between two consecutive transmissions and receiving time is relatively slow, which yields fewer samples and lower power consumption. This allows for a longer life for the system 10. State 1 prevents the transducers 20-22 from being blocked after power up 102.

The system 10 remains in state 2 until a target is detected within x1 cm from the transducers 20-22 face for T2 seconds. The method 100 the proceeds to step 110 where the system 10 is put into state 3 (see FIG. 7). Before state 3, the open collector near zone 50 is still off.

State 3 (step 110), corresponds to a state of the system following its detection of a target for T2 seconds. While in state 3, the open collector near zone 50 is on, which opens the liquid valve of the dispenser system 42, and remains on until one of the following two conditions is met:
   a target is detected for T4 seconds under the spigot 43; or
   no target is detected for T3 seconds, which means that the container is removed.

In the first case, the system 10 is put into state 5 and the method proceeds with step 114 and in the second case the system 10 goes into state 4 and the method proceeds with step 112.

While in the state 3, the PRT delay is fast.

According to the first illustrative embodiment, states 4 and 5 are identical. In both states, the open collector 50 is off, and the system remains in that respective state for respectively T5 and T6 seconds after a clear path has been detected. Then the system is put back into state 2 (step 108), ready to detect and to receive a new container 16.

It is to be noted that the distance x1 and x2 are defined perpendicularly from the transducers 20-22 faces. According to the first illustrative embodiment, the different parameters take the following values: x1=1.5 cm, x2=2.0 cm, T1=1.0 s, T2=0.5 s, T3=0.5 s, T4=60.0 s, T5=0.5 s, T6=0.5 s. Of course, different results and/or precision can be achieved using other values.

It is believed to be within the reach of a person skilled in the art to modify the method 100, and more specifically the number and goals of the detecting states 106-114, for different applications and/or to achieve other precision.

To avoid unwanted detection of a target, the micro-controller 18 is further programmed to require a newly detected target to appear more than once in a sub window defined by the initial position of the detection in subsequent excitations of the transmitter 20 as detected by the receiver 22. This method has been found adequate to filter out noise. The width of this sub window depends on the desired precision. It has been found that requiring the target to appear about three times in the sub window allows filtering out most of the noise without rejecting a real target.

The micro-controller 18 is further programmed to provide a void of signal before the excitation of the transmitter 20. More specifically, before every transmission in all states, the micro-controller 18 uses the receiver 22 to verify for environmental ultrasonic noise close to the operational frequency of the transmitter 20. If such noises are detected, the system 10 is prevented from operating until the environment is free of such noises. Predetermined threshold are used to determine whether the noises are strong enough to interfere with the normal operation of the system 10.

In addition to the wake up zone and multiple variable zones which have been described hereinabove, a Multiple Threshold and Signal Reconstructing Method (MTSRM) is further used to reduce false alarm rate (FAR). The MTSRM has been found especially efficient in the present case, where the target moves. As will now be described, a detecting accuracy less than ½ of the wavelength of the receiving beam is obtained by relating to the shape of the beam and by defining a threshold base on the incoming signal shape.

The MTSRM will now be described in more detail with reference to FIGS. 6A-6D.

Figure 6A:
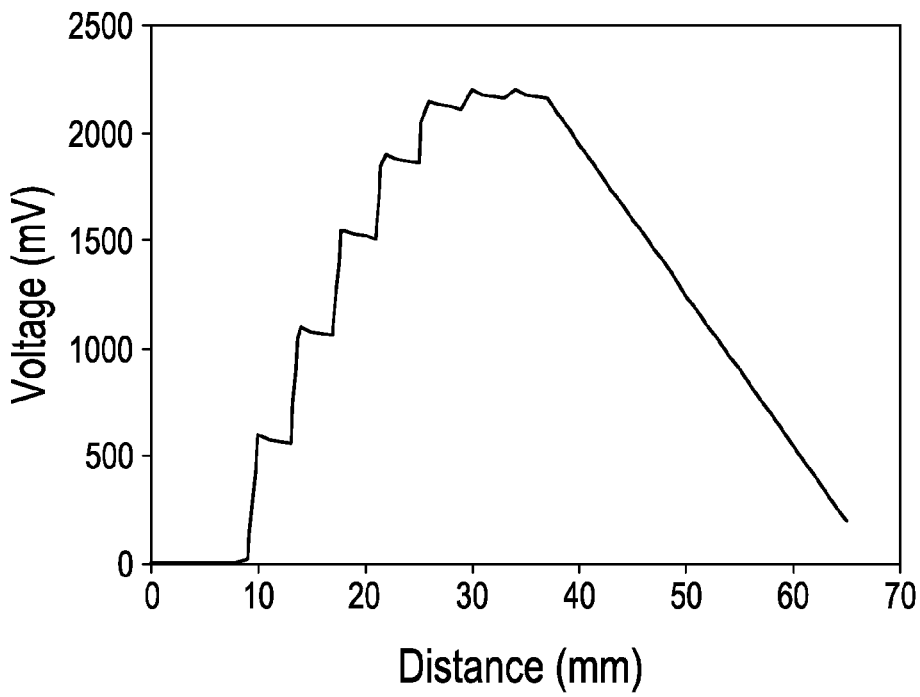
Figure 6B:
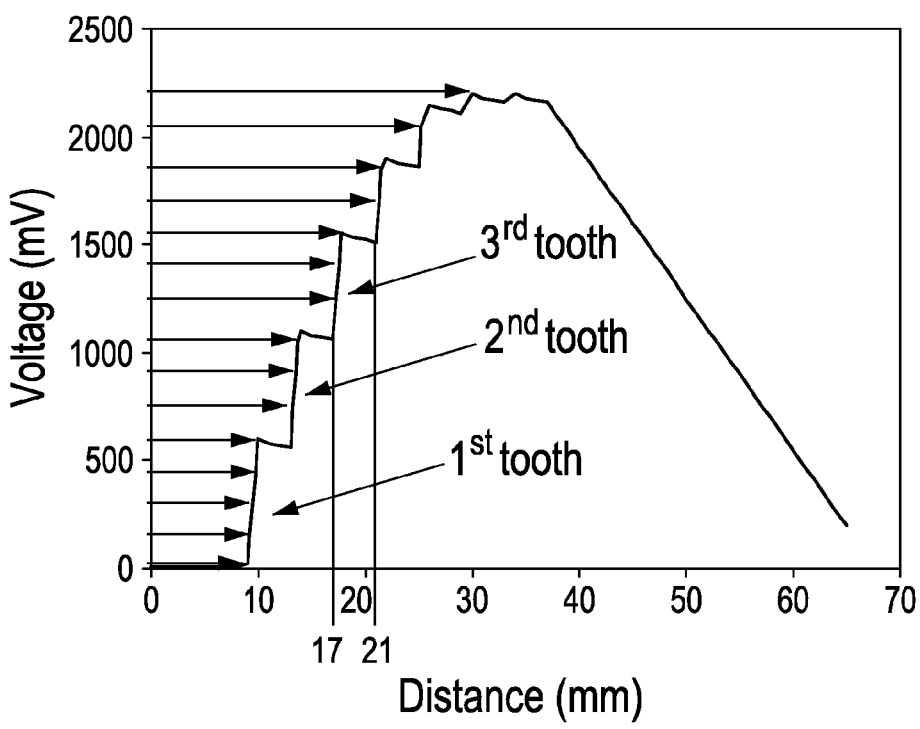

FIGS. 6A illustrates an example of an incoming signal, which looks like a saw-tooth.

The incoming signal is digitized by the ADC 46. Following this step, a conventional algorithm can be used to identify saw-teeth on the digitized signal (see FIG. 6B).

With reference to FIGS. 6C-6D, the location of the container 16 is identified by taking into account the sensor assembly 19 operating wavelength. It corresponds to the rising edge of the n'th saw-tooth.

The MTSRM allows for a measurement of the position of the target container beyond ½ wavelength of the transmitter wavelength. It further facilitates an accurate and repeatable definition of the container distance.

Figure 8:
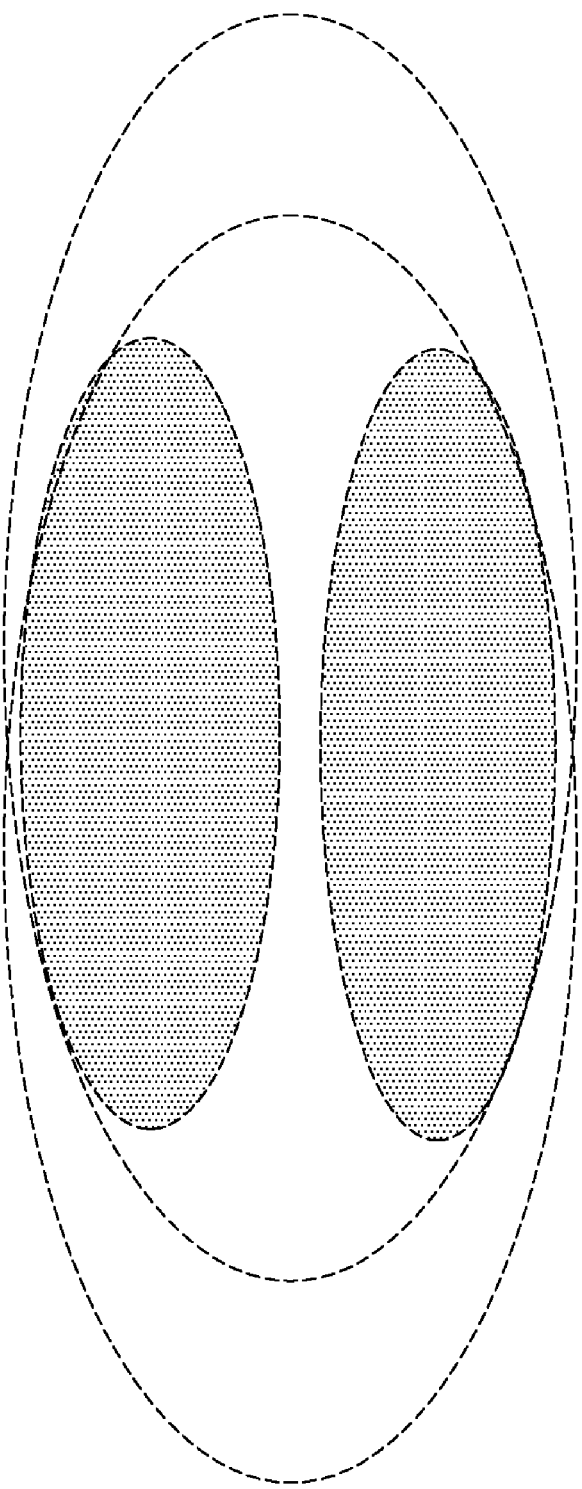
FIG. 8 illustrates transmitting and receiving beam patterns resulting in two different detection areas, according to a second illustrative embodiment of the present invention.

The relative position and angle of the transmitter 20 and receiver 22 can be modified to achieve different detection areas. For example, FIG. 8 illustrates alternative transmitting and detecting beam patterns, resulting in two separate fields of interest. For example, the detection pattern of FIG. 8 can be used to detect when the inner and outer rims of a container such as a glass (not shown) are within a predetermined range defined by the two detecting zone at the detecting position.

The system 10 and method 100 allow detecting the presence of a target, such as a container, immediately from the face of the sensor assembly 19, by eliminating the phenomenon of oscillation (decay time of the excitation signal) between the incoming and outgoing sound waves. This further allows for a very compact sensor system with a high signal to noise ratio which does not suffer from false alarm.

Figure 9A:
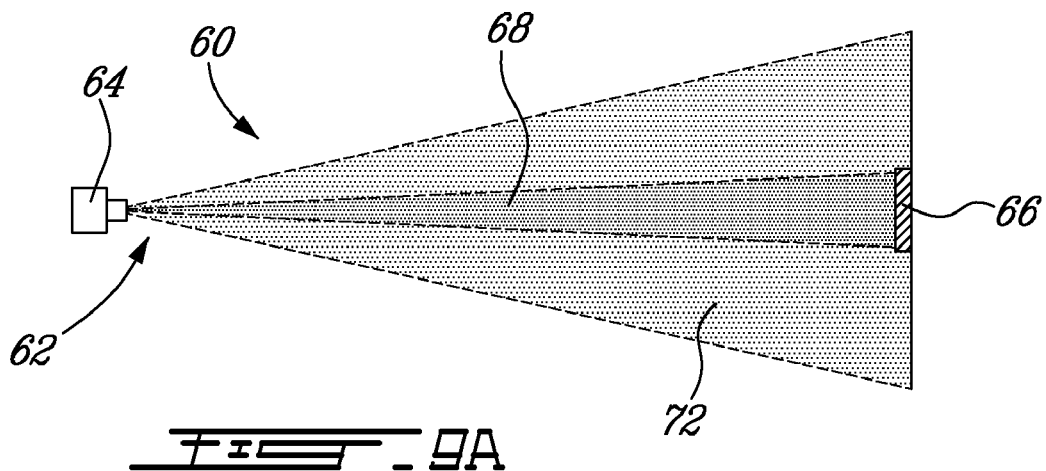
FIGS. 9A-9C are schematic views illustrating a sensor assembly part of a system for short-range ultrasonic location sensing according to a second illustrative embodiment of the present invention.
Figure 9B:
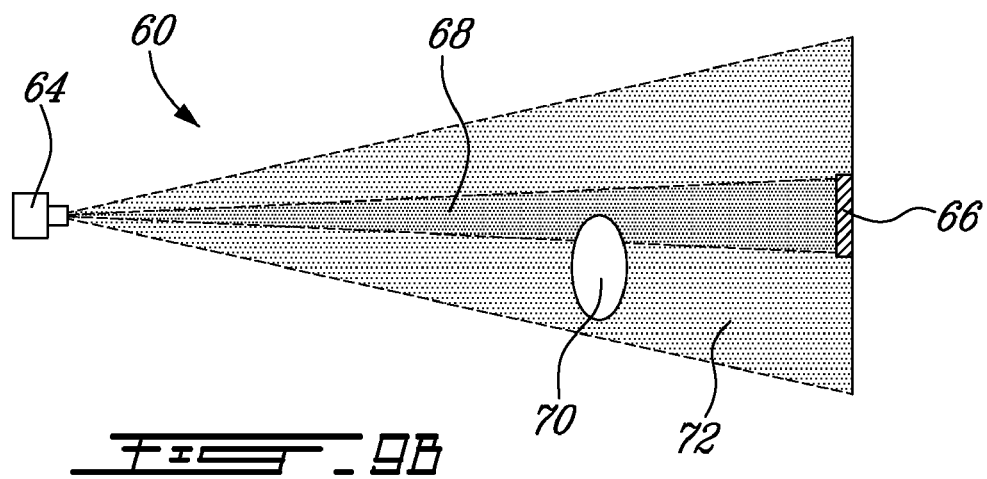
Figure 9C:
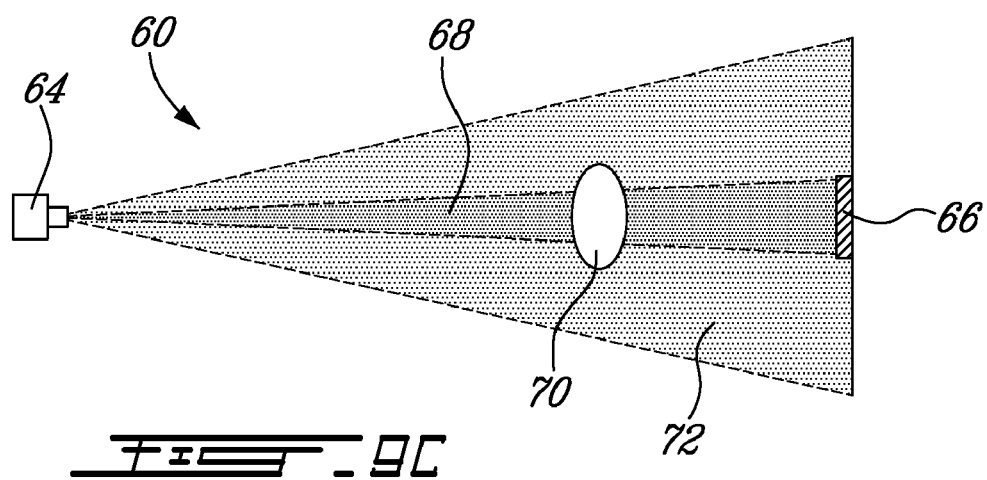

Turning now to FIGS. 9A-9C, a system 60 for short-range ultrasonic sensing according to a second illustrative embodiment of the present invention will now be described.

Since the system 60 is similar to the system 10, and for concision purposes, only the differences between these two systems will be described herein. More specifically, the system 60 differs from the system 10 by its sensor assembly 62 which is different from the assembly 19.

The sensor assembly 62 includes a transducer/emitter 64 forming an acoustic line 68 with a reflector/receiver 66. The line 68 is formed between the wider ultrasonic wave 72 and the reflector/receiver 66.

The system 60 can be used in a liquid dispenser, wherein the emitter 64 is on one side of the projected trajectory of a container/target 70 and the receiver or reflector 66 is on the other side so that the generated ultrasound beam 68 and the projected trajectory of the container cross.

As illustrated in FIG. 9C, when the acoustic line is broken by a target 70, such as a container, the expected receiving signal is interrupted, thereby indicating the presence of a target 70 at the location of the ultrasonic line 68. A partial crossing of the line 68, which is illustrated in FIG. 9B, causes a signal reduction. A major difference with the system 10, is that the system 60 detects a target when no echoes is detected, which is the opposite of the system 10.

Any of the algorithms described with reference to the system 10 can also be implemented in the micro-controller 18 of the system 60.

The micro-controller 18 of the system 60 further implements a time window algorithm to reduce FAR. According to this method, the signal analysis of the received echoes is limited to a region around and including the line 68 so that when the reflection of the line 68 disappears, any surrounded noises will be ignored, even though they can be detected by the system 60.

Also, to filter out noises and minimize FAR, emission patterns can be produced, whereby a target is detected when a predetermined minimum number of pulses are detected following the emission of an initial larger number of pulses.

Even though the sensor assembly 62 is illustrated with a single transducer 64 acting as both a transmitter and a receiver and including a reflector 66 to reflect the transmission beam 72 back to the transducer 64, a second transducer can be used instead of the reflector 66 to act as a receiver.

According to a third illustrative embodiment of the present invention, the system 60 includes two emitters 64 so as to allow eliminating signal amplitude variations due to interference between the outgoing beam 72 and the reflected beam 68. A configuration where more than three emitters can also be used. More specifically, two or more emitters 64 are used with a different starting time of ½ λ or ¼ λ. Alternatively, similar results can be achieved with two receivers being positioned at ½ λ or ¼ λ from the emitter 64.

A plurality of sensor assembly 62 can also be provided so as to allow the detection of a target at different locations.

A system for short-range ultrasonic sensing according to a fourth illustrative embodiment of the present invention (not shown) is in the form of the system 10 including an additional sensor assembly similar to the sensor assembly 62.

The method and system according to the present invention allows for the measurement to be indifferent of the temperature and the humidity which change the speed of sound and usually make accurate measurement more complex.

It is to be noted that many modifications could be made to the systems 10 and 60 described hereinabove for example:

- the use of a single one of the algorithms implemented in the micro-controller 18 as described hereinabove, or any other combinations of such algorithms can alternatively be used to reduce FAR for example;
- the use of an adaptive threshold method such as the one described in U.S. Pat. No. 7,130,244 B2 issued to Gal et al. on Oct. 31, 2006 and titled "Device and Method for Adaptive Ultrasound Sensing", which is incorporated herein by references, to reduce false detections while keeping system sensitivity high. Such an adaptive threshold method may be implemented for example to enhance the system's ability to detect different types of containers depending on the distance from the sensor;
- further providing an EPROM (Erasable Programmable Read Only Memory), or another storing means, to save parameter changes.

Even though the systems 10 and 60 have been described as being part of liquid dispensing systems to sense the location of a container, the present system and method for short-range ultrasonic sensing can be used to detect the location of other object and in other applications.

For example, since the present system and method is not affected by temperature changes and humidity, it can be used to accurately measure the distance in a harsh environment using a reference point which can play the role of the target at a set time. Such a system first establishes the reference distance and then when it is triggered, compares that distance to the one measured after the trigger. Such a method and system eliminates the adverse effects traditionally caused by environmental conditions that change the speed of sound, such as the temperature.

Although the present invention has been described hereinabove by way of illustrated embodiments thereof, it can be modified, without departing from the spirit and nature of the subject invention as defined in the appended claims.

What is claimed is:

1. A system for short-range ultrasonic detecting of a target; the system being part of a dispensing system including a spigot end that defines a dispensing direction; the system for detecting a target comprising:
    a sensor assembly that operates in the time domain including an ultrasound transmitter and an ultrasound receiver positioned side by side so as to yield respective transmitting and receiving beams that are oriented generally perpendicularly to the dispensing direction and which overlap at a first predetermined location distanced from the sensor assembly, yielding a first overlap of the transmitting and receiving beams defining a first detection area; and
    a controller coupled to both the transmitter and receiver that i) activates the transmitter and receiver; ii) causes the transmitter to emit the transmitting beam; iii) receives from the receiver an echo indicative of the presence of the target when the target enters the first detection area and iv) determines a distance of the target from the sensor assembly using a time difference between emitting of the transmitting beam and receiving of the echo.

2. A system as recited in claim 1, including at least one open collector to be opened when the target is detected.

3. A system as recited in claim 2, wherein the at least one open collector includes an open collector far zone to be opened when the target crosses a first limit positioned at a first distance from the sensor assembly and an open collector near zone to be opened when the target crosses a second limit positioned at a second distance from the sensor assembly; the second limit being closer to the sensor assembly than the first limit; the target being detected by the sensor assembly at each one of the first and second limit by modifying the position of the first detection area.

4. A system as recited in claim 2, wherein the at least one open collector opening the dispenser when the target is detected.

5. A system as recited in claim 1, wherein the controller being further for implementing variable relevance zones.

6. A system as recited in claim 5, wherein implementing the variable relevance zones causes the detection area to be different when the target moves towards the sensor assembly than when the target moves away from the sensor assembly.

7. A system as recited in claim 1, wherein the controller further using the receiver to verify for environmental ultrasonic noise close to the operational frequency of the transmitter prior to activating the transmitter.

8. A system as recited in claim 1, wherein the controller being further to control the opening of the dispensing system when the target enters the first detection area.

9. A system as recited in claim 1, further comprising, following the target entering the first detection area, the transmitting and receiving beams being controlled to overlap at a second predetermined location distanced from the sensor assembly that yields a second overlap of the transmitting and receiving beams defining a second detection area; and receiving from the receiver an echo indicative of the presence of the target when the target enters the second detection area, which is indicative of the target exiting the first detection area.

10. A method for short-range ultrasonic detecting of a target in a dispenser including a spigot end that defines a dispensing direction; the method comprising:
    transmitting an ultrasound detecting beam along a direction that is generally perpendicular to the dispensing direction;

receiving an ultrasound reflected beam which overlaps the ultrasound transmitting beam at a predetermined location that defines a detection area; the target being detected when it enters the detection area; and;

determining a position of the target in the detecting area by measuring a time delay between said transmitting an ultrasound detecting beam and said receiving an ultrasound reflected beam.

11. A method as recited in claim 10, further comprising dynamically modifying the position of the detection area.

12. A method as recited in claim 11, further comprising i) initially setting the position of the detection area at a first wake up position and ii) putting the system in sleep mode until the target is detected in the detection area, then iii) putting the system in a full working mode, and iv) setting the position of the detection area at a second position.

13. A method as recited in claim 12, wherein while the detection area is set at the wake up position, the controller is in a low energy consumption mode.

14. A method as recited in claim 11, wherein the target is detected when the detection area is blocked at a first position x1 for a time T1.

15. A method as recited in claim 14, further comprising waiting, prior to detecting the target, that a detection area located at a second position x2 is clear of a time T2.

16. A method as recited in claim 15, further comprising providing a void of acoustic signal before transmitting the ultrasound detecting beam.

17. A method as recited in claim 15, further comprising waiting prior to detecting the target at the first position that the target is detected at a third position x3 during a time T3.

18. A method as recited in claim 14, further comprising waiting prior to detecting the target at the first position that the target is detected at a second position x2 during a time T2.

19. A method as recited in claim 14, wherein the target is detected when at least two consecutive echoes are detected in a sub window, within the detection area, defined by the first of the at least two consecutive echoes.

20. A method as recited in claim 10, wherein the target is detected when at least two consecutive echoes are detected in a sub window, within the detection area, defined by the first of the at least two consecutive echoes.

21. A method as recited in claim 10, further comprising providing a void of signal before creating the ultrasound transmitting beam.

22. A method as recited in claim 10, wherein the detection area is ellipsoidal.

23. A method as recited in claim 10, wherein the detecting and receiving beams are both characterized by a wavelength; the method further comprising implementing a multiple threshold and signal reconstructing method (MTSRM) on the ultrasound receiving beam, yielding a detecting accuracy of a position of the target in the detecting area within less than half the wavelength.

24. A method as recited in claim 23, wherein the MTSRM including i) digitizing the ultrasound receiving beam so as to yield a digitized signal, ii) identifying saw-teeth in the digitized signal, each characterized by a rising edge and iii) identifying a position of the container using the position of the rising edge of the farest saw tooth among the saw-teeth.

* * * * *